United States Patent [19]

McConkey

[11] Patent Number: 5,077,876
[45] Date of Patent: Jan. 7, 1992

[54] SPINDLE ASSEMBLY FOR A SINGLE OR A MULTIPLE SPINDLE MACHINE

[75] Inventor: James W. McConkey, Delta, Ohio
[73] Assignee: Coldstream, Toledo, Ohio
[21] Appl. No.: 461,261
[22] Filed: Jan. 5, 1990
[51] Int. Cl.⁵ .............................................. B23B 19/00
[52] U.S. Cl. ...................................... 29/27 R; 82/142; 82/165; 279/50; 408/23; 408/56
[58] Field of Search ............... 408/23, 56, 57; 279/20, 279/1 E, 1 F, 43, 50; 29/27 R, 2 7 C, 27 A, 38 B; 82/142, 147, 157, 165

[56] References Cited
U.S. PATENT DOCUMENTS

| 2,593,687 | 4/1952 | Mentzer | 29/38 B X |
|---|---|---|---|
| 3,643,969 | 2/1972 | Finley et al. | 408/56 |
| 3,688,364 | 9/1972 | Ledergerber | 29/380 |
| 3,727,930 | 4/1973 | Anderson | 279/50 |
| 3,744,355 | 7/1973 | Flisch . | |
| 3,978,565 | 9/1976 | Flisch . | |
| 4,011,777 | 3/1977 | McConnell . | |
| 4,014,558 | 3/1977 | Brinkman | 279/50 |
| 4,106,376 | 8/1978 | Freer . | |
| 4,445,405 | 5/1984 | Champeau et al. . | |
| 4,457,193 | 7/1984 | Matthey . | |
| 4,640,652 | 2/1987 | Rivera, Jr. | 279/20 X |
| 4,763,549 | 8/1988 | Hata et al. . | |
| 4,827,815 | 5/1989 | Hata et al. . | |

FOREIGN PATENT DOCUMENTS

| 1288404 | 1/1969 | Fed. Rep. of Germany | 279/43 |
|---|---|---|---|
| 2253387 | 8/1973 | Fed. Rep. of Germany | 29/27 R |
| 515561 | 4/1921 | France | 279/1 F |
| 275512 | 5/1951 | Switzerland | 279/50 |

Primary Examiner—Daniel W. Howell
Attorney, Agent, or Firm—Willian Brinks Olds Hofer Gilson & Lione

[57] ABSTRACT

An improved spindle assembly for a single or a multiple spindle machine is disclosed. An outer tubular member is mounted for rotation by the spindle machine. An inner shaft is positioned within the tubular member and a collet is movable between a locked and an unlocked position. A workpiece can be removed from the unlocked collet by high pressure liquid from the inner shaft. In one embodiment the inner shaft is rotated independently from the tubular member and is also axially reciprocable. A tool mounted on the inner shaft provides for interior machining at the same time as an exterior operation is being performed. In another embodiment the collet remains axially stationary.

24 Claims, 5 Drawing Sheets

SPINDLE ASSEMBLY FOR A SINGLE OR A MULTIPLE SPINDLE MACHINE

BACKGROUND OF THE INVENTION

The present invention is directed to an improved spindle assembly for a single or a multiple spindle machine. Multiple spindle machines are well known in the art. The machine shown in the drawings is a modified Acme-Gridley multiple spindle machine. Other types of multiple spindle machines are shown in, for examples, U.S. Pat. Nos. 3,688,364; 3,744,355; 3,978,565; and 4,011,777.

In many prior art multiple spindle machines, a workpiece holding collet is positioned at the end of each spindle. The collet is movable between an open and closed position. When in the closed position, it holds a workpiece while an exterior machining operation is performed. These machining operations may include cutting operations, drilling operations, tapping, broaching, deburring, or any other similar type machine operations. In many prior art machines, when the exterior machining operation was completed, the prior art spindles included mechanical ejector mechanisms within the spindles which contacted the back of the workpiece to eject the workpiece from the spindle. A prior art mechanical ejector is disclosed in U.S. Pat. No. 4,106,376. This patent discloses the use of an ejector rod to eject the workpiece. This patent also discloses the use of an air blast to blow air into the rear end of the spindle assembly to blow chips and coolant out of the collet and to discharge the workpiece.

In using several of the prior art spindle assemblies, there is often no consistency with respect to the location of the front end of the collet after the workpiece has been removed and a new workpiece is inserted. Often, the axial relationship of the collet relative to the front end of the spindle assembly and to the exterior tool must constantly be monitored and adjusted.

The primary object of the present invention is to provide an improved spindle assembly for a multiple spindle machine in which a liquid, such as a water base liquid or an oil base liquid, is utilized to discharge the workpiece from the collet.

In one embodiment of the present invention, an inner shaft which is positioned within the outer tubular member of the improved spindle assembly includes a tool holder mounted adjacent its outer end so that an interior machining operation may be performed on the back side of the workpiece at the same time as the exterior machining operation is being performed on the front side of the workpiece.

In still another embodiment of the present invention, the front end of the collet, which holds the workpiece is axially fixed relative to the outer end of the spindle assembly. The collet can be opened and closed to release and position a new workpiece while maintaining the correct position of the collet and workpiece relative to the tool thereby eliminating many of the adjustments needed in prior art spindle assemblies.

SUMMARY OF THE INVENTION

The present invention is directed to an improved spindle assembly for a single spindle or multiple spindle machine which includes a single or a plurality of rotatable spindles which hold workpieces at their outer ends for multiple exterior machining operations. An improved spindle assembly, according to the present invention, includes an outer tubular member mounted for rotation by such spindle machine. The spindle machine includes a primary motor drive for rotating each of said outer tubular members of the spindle assemblies. An inner shaft is positioned within the tubular member and a collet assembly is mounted on the outer end of the tubular member. The collet assembly is movable between a locked and unlocked position. A workpiece can be removed when in the unlocked position. The inner shaft defines an axial liquid passageway in liquid communication with the collet assembly. A high pressure pump supplies pressurized liquid to the axial passageway and to the collet assembly for ejecting the workpiece from the collet assembly when in the unlocked position.

In one embodiment, a drive means is provided for rotating the inner shaft at speeds differing from the speed of rotation of the outer tubular member. A tool holder is mounted inside the spindle assembly adjacent the outer end of the inner shaft. A separate drive axially reciprocates the inner shaft, whereby a tool in the tool holder can be moved into position against the back side of a workpiece so that an interior machine operation can be performed on the workpiece at the same time as the typical exterior machining operation is being performed on the same workpiece.

In still another embodiment, the improved spindle assembly includes an outer end for receiving a workpiece which remains axially stationary with respect to the outer end of the outer tubular spindle member. An axially movable collet shaft is positioned within the tubular spindle member. The axially movable collet shaft is operatively connected to the collet for moving the collet between a locked and an unlocked position while the outer end of the collet remains axially stationary. This allows workpieces to be introduced into the open collet without the necessity of readjusting the axial position of the collet.

The primary object of the present invention is to provide an improved spindle assembly for a single or a multiple spindle machine which increases the productivity of such multiple spindle machines. Other objects will be apparent from the following detailed discussion of the preferred embodiments.

DETAILED DESCRIPTION OF THE PREFERRED EMBODIMENTS

Figure 1:
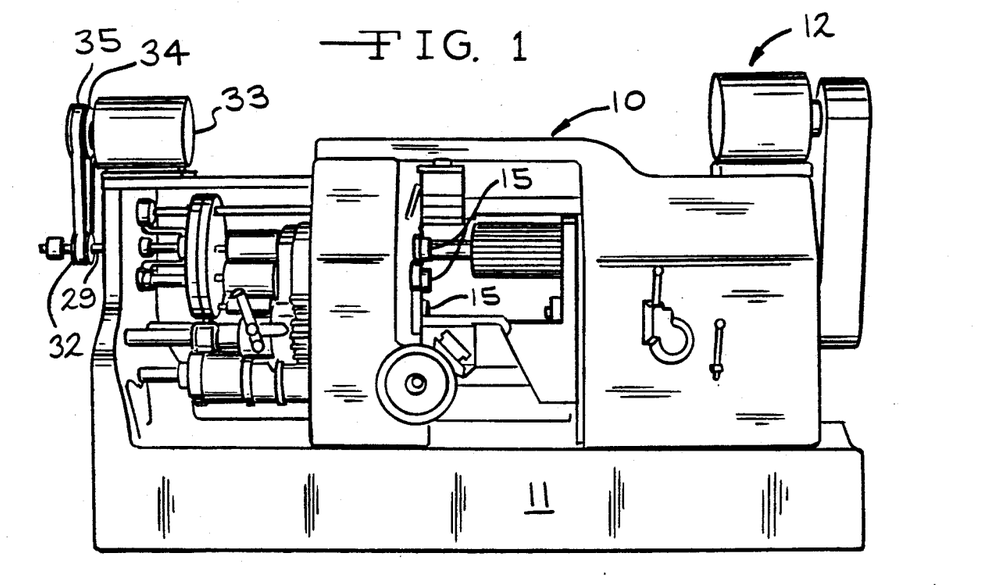
FIG. 1 is an elevational view of a multiple spindle machine which includes improved spindle assemblies, according to the present invention.
Figure 2:
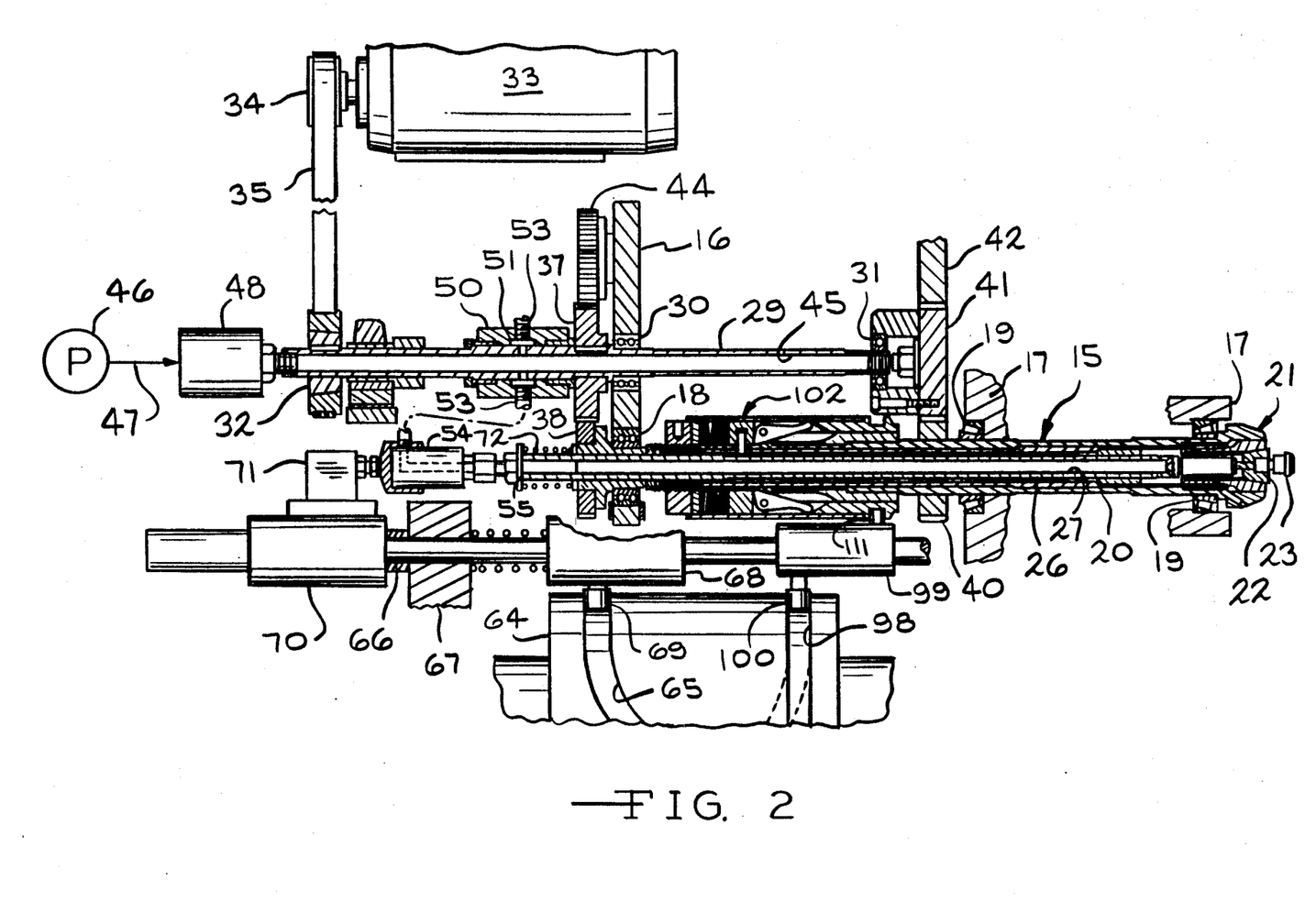
FIG. 2 is a fragmentary side view in cross section showing an improved spindle assembly, according to the present invention.
Figure 3:
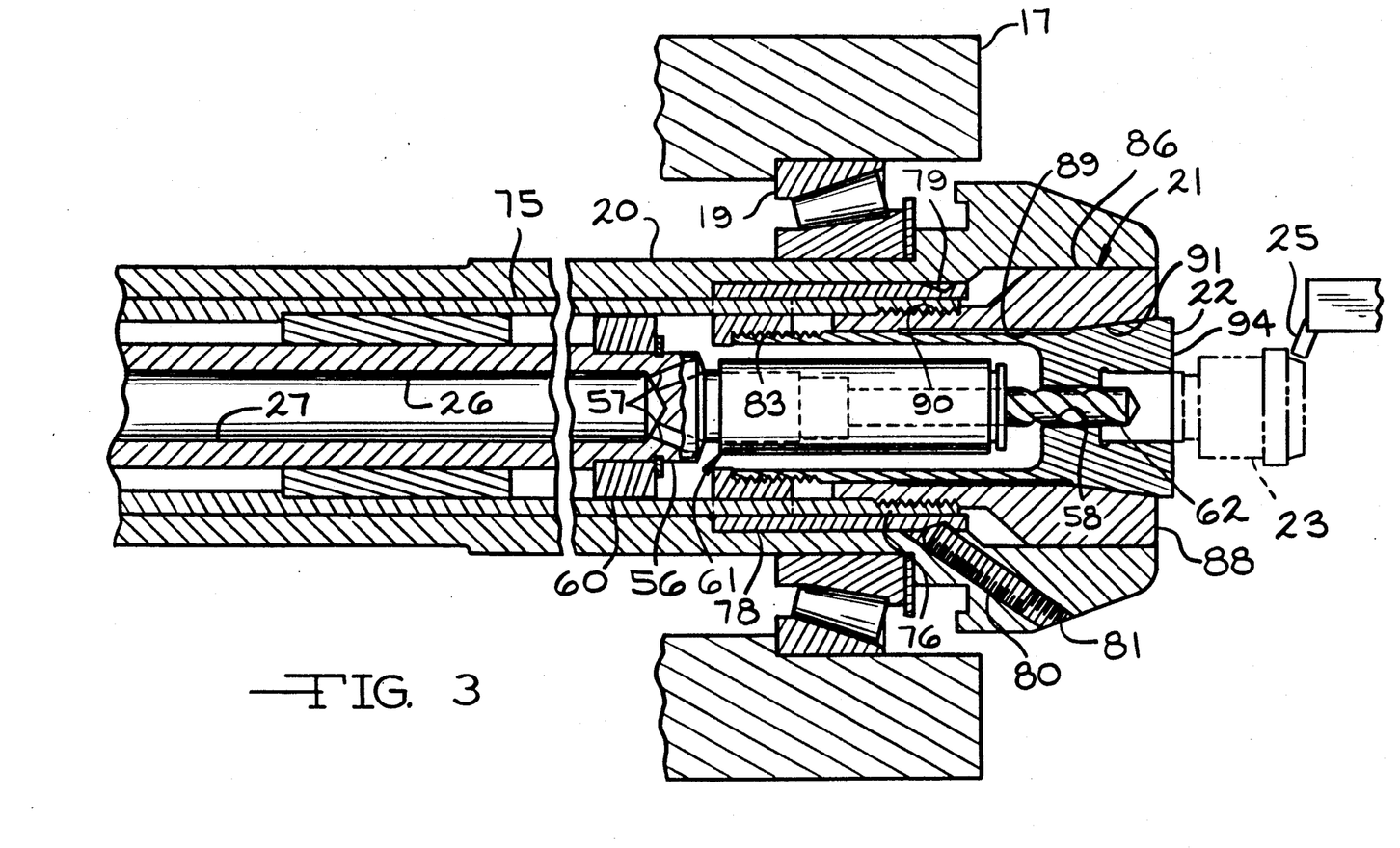
FIG. 3 is an enlarged fragmentary cross section of the spindle assembly shown in the FIG. 2 and showing the collet assembly in the closed positioned.

A multiple spindle machine is generally indicated in FIG. 1 by the reference number 10. However, the present invention is also directed to single spindle machines. The multiple spindle machine 10 includes a main frame 11 and a main motor drive 12. The main motor drive 12 is operatively connected to a plurality of improved spindle assemblies 15 which are constructed according to the present invention. Referring to FIG. 2, supports 16 and 17 connected to the spindle carriage of the main frame 11 of the multiple spindle machine 10 include bearings 18 and 19 for rotatably mounting an improved spindle assembly 15. The spindle assembly 15 includes an outer tubular member 20 which is driven by the main motor drive 12. The spindle assembly 15 also includes a collet assembly 21 including a split collet 22 which locks and unlocks to receive a workpiece 23. The collet 22 holds the workpiece 23 for performing an exterior machining operation, for example, by an exterior cutting tool 25 as indicated in FIG. 3.

A longitudinally extending inner shaft 26 having a longitudinally extending axially liquid passageway 27 is positioned within the outer tubular member 20. A machine shaft 29 is rotatably supported by bearings 30 and 31 and includes a drive pulley 32 mounted adjacent one end. A drive motor 33 having an output pulley 34 is connected to the pulley 32 by a drive belt 35. The motor 33, in other embodiments, can also be a hydraulic motor or an air operated motor.

A drive gear 37 is keyed to the machine shaft 29 and is operatively connected to a gear 38 fixed to the inner shaft 26. The inner shaft 26 is driven by the drive motor 33 independently of the outer tubular member 20, which is rotatably driven by a gear 40 acting through idler gears 41 and drive gears 42 operatively connected to the main motor drive 12. An idler gear 44 mates with the drive gear 37 mounted on the machine shaft 29 and is interconnected with other ones of the spindle assemblies 15 (not shown). Multiple spindle machines normally have 4, 6 or 8 spindle assemblies.

The machine shaft 29 defines a longitudinally extending liquid passageway 45. A high pressure pump 46 provides a high pressure liquid through a conduit 47 to a rotary fluid connector unit 48 which is mounted on one end of the machine shaft 29. The high pressure pump 46 supplies high pressure liquids such as oil based liquids or water based liquids. One preferred high pressure liquid is a water based coolant. The liquid pressure preferably falls in a range between 100 p.s.i. and 2000 p.s.i. or higher.

Figure 4:
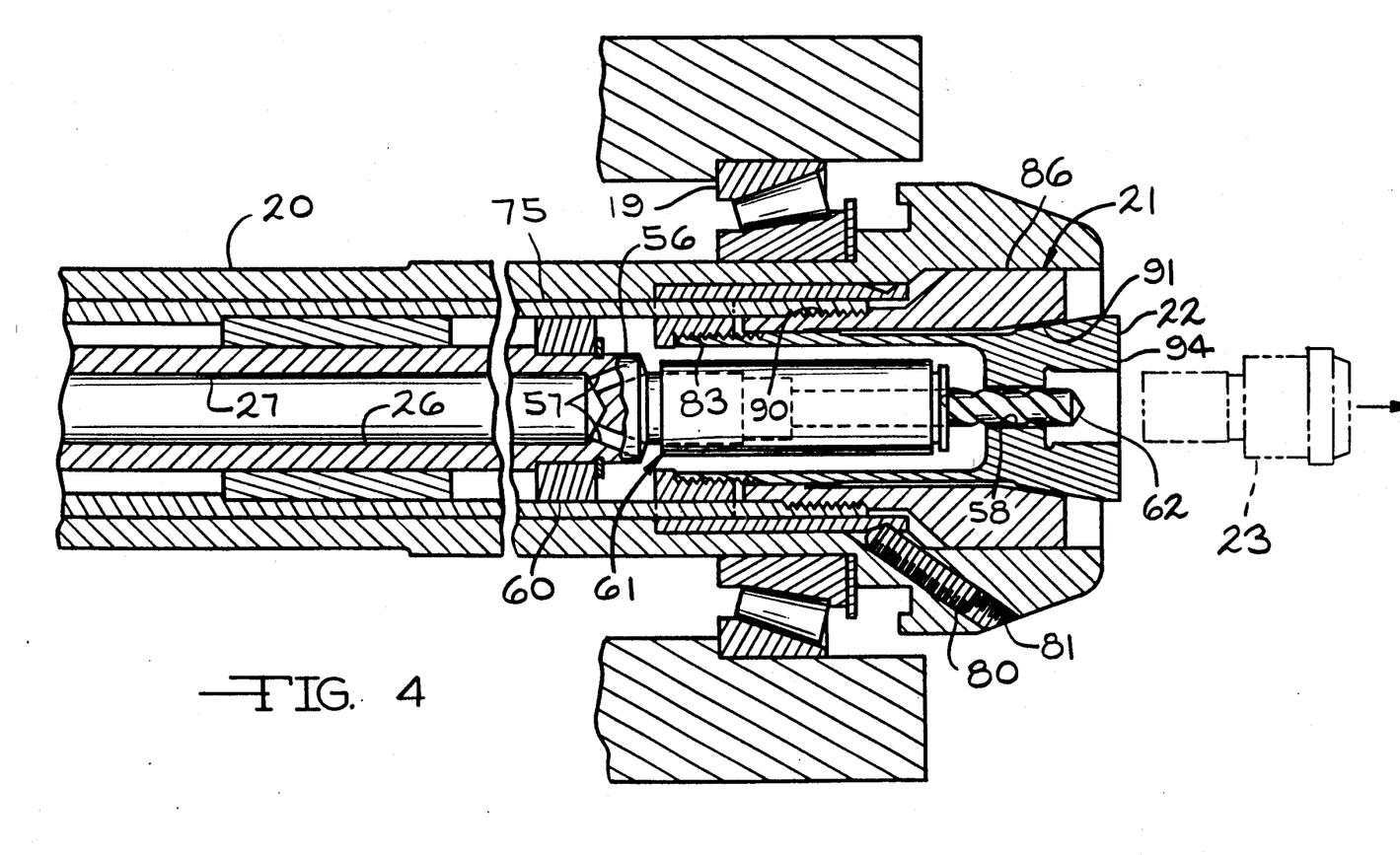
FIG. 4 is a view similar to FIG. 3 showing an exaggerated unlocked position of the collet assembly.

A liquid discharge ring 50 has a circular groove 51 and a plurality of discharge conduits 53. The discharge conduits 53 are in liquid communication with rotable liquid connectors 54 mounted on a first end 55 of the inner shaft 26. The discharge conduits 53 supply the high pressure liquid to the axial liquid passageway 27 of the inner shaft 26. Referring to FIGS. 2, 3 and 4, a second end 56 of the inner shaft 26 defines liquid passageways 57 for delivering the high pressure liquid to the back side of the collet 22. The liquid passes through a center bore 58 and engages the back of the workpiece 23 to discharge the workpiece when the collet assembly 21 is moved to the unlocked position, as shown in FIG. 4.

Preferably a liquid seal unit 60 is positioned on the exterior of the inner shaft 26 adjacent its second end 56 to prevent liquid under pressure from flowing out of the liquid passageways 57 and backwards down the exterior of the inner shaft 26.

It has been found that the high pressure liquid speedily and reliably discharges the workpieces 23 in a high rate production situation. It has also been found that it is not possible to use air pressure to consistently discharge workpieces 23 in a high rate production multiple spindle machine. The lack of air sealing does not allow sufficient consistent force to the back side of the workpieces to consistently discharge the workpieces in a high rate production situation.

Referring to FIGS. 3 and 4, in the present embodiment a tool holder 61 is mounted on the second end 56 of the inner shaft 26. A drill bit 62 is illustrated in the tool holder 61. In addition to being rotatable, the inner shaft 26 is also axially reciprocal when the drill bit 62 is performing a back drilling operation on the workpiece 23, as shown in FIG. 3. Therefore, the improved spindle assembly 15, according to the present invention, has the ability to perform both an exterior machining operation and an interior machining operation on the workpiece 23 at the same time. This is a major improvement in the spindle machine art. It should be understood that the interior machining operation may consist of many different types of operations including, but not limited to, drilling, tapping, deburring and broaching. The interior shaft 26 and its tool holder 61 is driven by the drive motor 33 at variable speeds, including speeds up to 10,000 rpm or higher.

Referring to FIG. 2, drive means are provided for axially reciprocating the inner shaft 26. In the FIG. 2 embodiment, the reciprocating drive means includes a rotatable cam drum 64 having a cam groove 65 positioned adjacent the inner shaft 26. A longitudinally extending bar 66 is reciprocally supported by a machine support 67. A follower sleeve 68 having a follower 69 is fixedly connected to the bar 66. The follower 69 is positioned within the cam groove 65 and is driven by the cam drum 64 along the cam groove 65. A drive sleeve 70 having a pusher block 71 is fixably mounted on the bar 66 with the pusher block 71 engaging the fluid connector 54 mounted adjacent the first end 55 of the inner shaft 26. A spring 72 surrounds the first end 55 of the inner shaft 26 and serves as a spring return for aiding reciprocal movement of the inner shaft 26. After the drilling operation is completed, the spring 72 urges the drill bit to the left, as shown in FIG. 2. During a typical machining operation, the movement of the follower 69 in the cam groove 65 transfers a reciprocating force through the pusher block 71 to urge the drill bit 62 or other machine tool into position against the back side of the workpiece 23. The inner shaft 26 is both independently rotatable and also axially reciprocal.

The collet assembly 21 (referring to FIG. 7) of the improved spindle assembly 15, acording to the present invention, provides a positive stop for the collet 22. In the present embodiment, the collet 22 remains in an axially stationary position with the collet locking and unlocking to secure and remove a workpiece.

Figure 7:
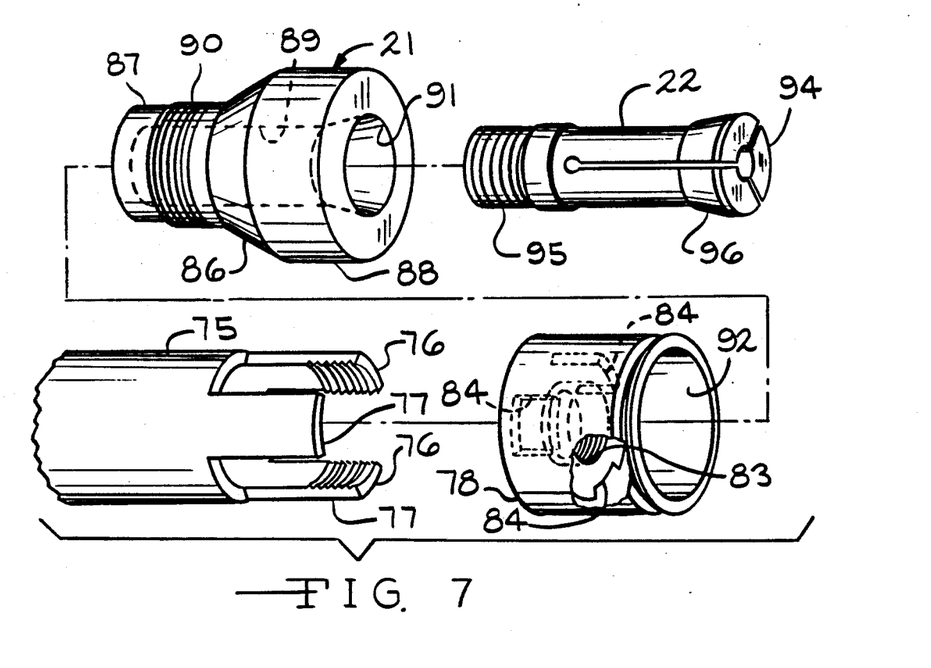
FIG. 7 is a fragmentary exploded view of various parts of the collet assembly.

The collet assembly 21 includes an axially movable collet shaft 75 positioned between the outer tubular member 20 and the inner shaft 26. As best seen in FIG. 7, the collet shaft 75 includes a plurality of longitudinally extending threaded fingers 76 at its outer end 77. A collet sleeve 78 having an exterior circular groove 79 is fixed to and rotatable with the outer tubular member 20. The collet sleeve 78 does not move axially and is retained relative to the outer tubular member 20 by a set screw 80 which is received in a threaded opening 81 in the outer tubular member 20. The inner end of the set screw 80 is received by the circular groove 79 of the collet sleeve 78.

The collet sleeve 78 includes a central threaded bore 83 and a plurality of longitudinally extending openings 84. The openings 84 receive the threaded fingers 76 of the collet shaft 75.

Referring to FIG. 7, a collet holder 86 having a first end 87 and a second end 88 defines a central opening 89. Exterior threads 90 are provided on the collet holder 86 adjacent the first end 87. The central opening 89 of the collet holder 86 defines a first tapered surface 91 adjacent the second end 88 of the collet holder 86.

The first end 87 of the collet holder 86 is positioned within a main opening 92 of the collet sleeve 78. The collet shaft threaded fingers 76 are threadably engaged with the exterior threads 90 on the outer surface of the collet holder 86. The collet holder 86 moves axially with the collet shaft 75.

Referring to FIG. 7, the collet 22 includes a workpiece receiving end 94 and a threaded end 95. The collet also defines a second tapered surface 96 on its exterior which is complementary with the first tapered surface 91 on the interior of the collet holder 86. The threaded end 95 of the collet 22 extends through the central opening 89 of the collet holder 86 and is attached to the central threaded bore 83 of the collet sleeve 78. Therefore, the collet 22 remains in an axially fixed position. During axial movement of the collet shaft 75, the first tapered surface 91 of the collet holder 86 engages the second tapered surface 96 of the collet 22 to move said collet between the open position shown in FIG. 4 and the closed position shown in FIG. 3. In the open position shown in FIG. 4, a new workpiece 23 may be placed in the collet 22. The collet assembly 21 may then be moved to the closed position shown in FIG. 3 whereby the workpiece 23 is correctly positioned radially and axially for the next machining operation. The workpiece receiving end 94 of the collet 22 always remains in a relative axially fixed position to provide a correct stop for the workpiece 23 without axial adjustment of the collet 22.

Figure 5:
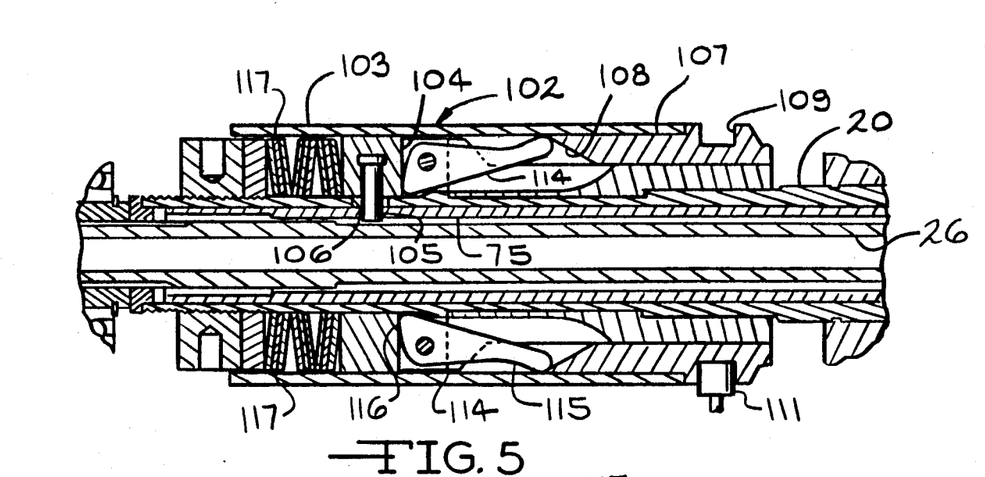
FIG. 5 is an enlarged fragmentary view of the drive mechanism for locking and unlocking the collet assembly and showing the apparatus in the locked position.
Figure 6:
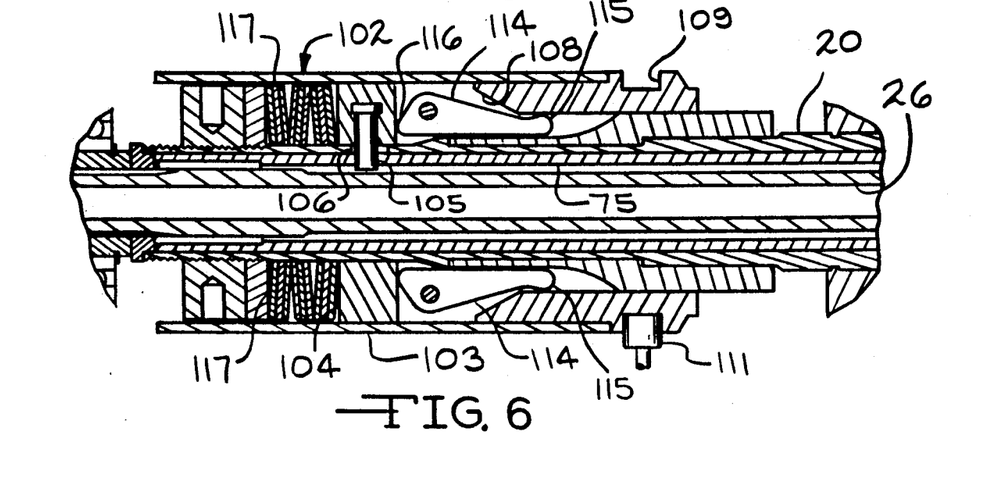
FIG. 6 is a view similar to FIG. 5 showing the apparatus in the unlocked position.

Referring to FIGS. 2, 5 and 6, the means for axially reciprocating the collet shaft 75 includes the rotatable cam drum 64. A collet groove 98 is defined by the cam drum 64. A collet sleeve 99 is movably mounted on the bar 66 and includes a follower pin 100 positioned within the collet groove 98 of the cam drum 64.

A slide tube assembly 102 surrounds the collet shaft 75 and includes an outer tube 103 and an inner slideable ring block 104. A plurality of drive pins 105 are mounted by the ring block 104 and extend through openings 106 defined in the peripheral wall of the outer tubular member 20. The ends of the drive pins 105 are connected to the collet shaft 75. A slide member 107 having an inclined surface 108 and an outer circular groove 109 is mounted at one end of the outer tube 103 of the slide tube assembly 102.

The collet sleeve 99 mounted on the bar 66 includes a bronze or fiber shoe 111 which is positioned in the groove 109 of the slide tube assembly 102. Movement of the follower pin 100 along the collet groove 98 of the cam drum 64 slides the collet sleeve 99 along the bar 66 and acting through the fiber shoe 111 in the groove 109 also slides the outer tube 103 and the slide member 107 of the slide tube assembly 102. This effectively moves the collet shaft 75 to open and close the collet 22. The force is transferred through the slide member 107. Pivotable levers 114, having first ends 115 and second ends 116 are mounted adjacent the slideable ring block 104. A spring pack 117, in this embodiment a Belleville spring pack, is mounted on the outer side of the ring block 104. The spring pack 117 acting through the drive pins 105 urges the collet shaft 75 toward the collet closed position, as shown in FIG. 3.

When the slide member 107 is moved to the left by the force of the fiber shoe 111, the inclined surface 108 engages the first ends 115 of the levers 114, wherein the mechanical advantage of the levers 114 urges the second ends 116 against the ring block 104, to compress the spring pack 117 and drive the collet shaft 75 to the left, wherein the collet 22 is moved to the open position. FIG. 5 shows the unit in the collet closed position, while FIG. 6 shows the unit in the collet open position.

Many revisions may be made to the embodiment disclosed in the above specification and drawings without departing from the scope of the following claims.

I claim:

1. A spindle assembly for a spindle machine having at least one spindle for holding a workpiece during a machining operation, said spindle assembly comprising, in combination, an outer tubular member having an outer end and mounted for rotation on such spindle machine, drive means for rotating said outer tubular member, an inner shaft positioned within said outer tubular member, bearing means for rotatably supporting said inner shaft within said outer tubular member, a collet assembly mounted on said outer end of said outer tubular member, said collet assembly being movable between a locked position and an unlocked position, said inner shaft defining an axial liquid passageway in liquid communication with said collet assembly, pump means for supplying a pressurized liquid and coupling means for providing said pressurized liquid to said axial passageway, whereby said pressurized liquid ejects such workpiece from said collet assembly when in such unlocked position.

2. A spindle assembly, according to claim 1, wherein said liquid is a water based liquid.

3. A spindle assembly, according to claim 2, wherein said liquid is a water based liquid machining coolant.

4. A spindle assembly, according to claim 1, wherein said liquid is an oil based liquid.

5. A spindle assembly, according to claim 1, wherein said inner shaft defines at least one passage extending between such axial liquid passageway and said collet assembly for supplying such liquid to said collet assembly, and liquid sealing means disposed about said inner shaft for inhibiting liquid from moving axially along the outside of said inner shaft.

6. A spindle assembly, according to claim 1, including second drive means for rotating said inner shaft, a tool holder mounted adjacent the outer end of said inner shaft and third drive means for axially reciprocating said inner shaft, whereby an interior machining operation can be performed on a workpiece within the collet assembly.

7. A spindle assembly, according to claim 6, wherein said second drive means comprises a rotatable machine shaft supported by such rotatable spindle machine parallel to said inner shaft, a drive motor operatively connected to said machine shaft, a drive gear mounted on said machine shaft and a driven gear mounted on said inner shaft and mating with said drive gear, whereby said inner shaft is rotated by said motor independently of said outer tubular member.

8. A spindle assembly, according to claim 7, wherein said third drive means comprises a rotatable cam drum mounted adjacent said inner shaft, said cam drum defining a cam groove, a longitudinally extending bar positioned between said cam drum and said inner shaft, said bar mounting a cam follower engagable for movement within said cam groove, connector means between said bar and said inner shaft whereby reciprocal movement of said bar transfers reciprocal movement to said inner shaft.

9. A spindle assembly, according to claim 8, including spring means on said inner shaft for urging said inner shaft against said connector means.

10. A spindle assembly, according to claim 1, wherein said outer tubular member includes an outer end and wherein said collet assembly includes an axially movable collet shaft positioned between said outer tubular member and said inner shaft, said collet shaft having an outer end and an inner end, said collet shaft including a plurality of longitudinally extending threaded fingers at its outer end, a collet sleeve retained adjacent to and rotatable with said outer tubular member, said collet sleeve having a central threaded bore and a plurality of longitudinally extending openings, said collet shaft threaded fingers extending through said openings, a collet holder having first and second ends and a central opening, exterior threads on an outer surface of said collet holder adjacent said first end, said central opening defining a first tapered surface, said first end of said collet holder extending within said collet sleeve, said collet shaft threaded fingers engaging said exterior threads on said outer surface of said collet holder, whereby said collet holder is axially movable with said collet shaft, a collet having a workpiece receiving end and a threaded end, said collet defining a second tapered surface, said threaded end of said collet extending through said central opening of said collet holder and being attached to said central threaded bore of said collet sleeve, wherein said workpiece receiving end of said collet remains in an axially fixed position, said first tapered surface of said collet holder engaging and being axially movable with said second tapered surface of said collet to move said collet between such open position and such closed position, and means for axially moving said collet shaft to operatively move said first tapered surface relative to said second tapered surface.

11. A spindle assembly, according to claim 10, wherein said means for axially moving said collet shaft includes a rotatable cam drum mounted adjacent said collet shaft, said cam drum defining a collet groove on its outer surface, a follower member positioned in said collet groove, said follower member being operatively connected to said collet shaft for axially moving said collet shaft.

12. A spindle assembly, according to claim 11, including spring means for biasing said collet toward its closed position.

13. A spindle assembly, according to claim 12, wherein said spring means comprises a Belleville spring pack surrounding said collet shaft.

14. A spindle assembly for a spindle machine having at least one rotatable spindle for holding a workpiece, said spindle assembly comprising, in combination, a tubular spindle member mounted for rotation about a longitudinal axis on such spindle machine, said tubular spindle member having an inner end and an outer end, a collet assembly disposed at said outer end, said collet assembly including an axially movable collet shaft positioned within said tubular spindle member, a collet having an inner end coupled to said tubular spindle member and an outer workpiece receiving end defining at least a pair of inwardly extending slots, said workpiece receiving end of said collet being axially fixed relative to said outer end of said tubular spindle member, and collet operating means coupled to said collet shaft for moving said collet between a closed position and an open position, wherein such workpiece can be removed when in such open position.

15. A spindle assembly, according to claim 14, wherein said collet operating means includes a plurality of threaded fingers, a collet sleeve rotatable with said tubular spindle member, said collet sleeve having a central threaded bore and a plurality of finger openings, said collet shaft fingers extending through said finger openings, a collet holder having first and second ends, a central opening and exterior threads adjacent said first end, said central opening defining a first tapered surface, said first end of said collet holder extending within said collet sleeve, said collet shaft threaded fingers engaging said exterior threads of said collet holder, said collet having a second tapered surface complementary with said first tapered surface of said collet holder, and means for axially moving said collet shaft to move said first tapered surface relative to said second tapered surface to close and open said collet.

16. A spindle assembly, according to claim 15, wherein said means for axially moving said collet shaft includes a rotatable cam drum mounted adjacent said collet shaft, said cam drum defining a collet groove on its outer surface, a follower member positioned in said collet groove, said follower member being operatively connected to said collet shaft for axially moving said collet shaft.

17. A spindle assembly, according to claim 16, including spring means for biasing said collet toward its closed position.

18. A spindle assembly, according to claim 17, wherein said spring means comprises a Belleville spring pack surrounding said collet shaft.

19. A spindle assembly, according to claim 16, including a slide tube assembly surrounding said collet shaft, said slide tube having a circular outer groove, a drive pin operatively connected to said follower member positioned with said outer groove, a plurality of drive members connected between said slide tube and said collet shaft, whereby movement of said follower member in said collet groove axially moves said collet shaft.

20. A spindle assembly, according to claim 19, including an inclined surface defined on said slide tube assembly, a plurality of levers pivotally mounted adjacent said inclined surface, a slideable slide ring connected to said collet shaft and between said spring means and said lever arms, each of said lever arms having a first end engagable with said slide tube inclined surface and seconds engagable with said slide ring, whereby movement of said inclined surface against said levers compress side spring means and moves said collet shaft toward the unlocked collet position.

21. An apparatus for a spindle machine having at least one rotatable spindle comprising, in combination, an outer tubular member mounted for rotation and having an outer end, first drive means for rotating said outer tubular member, a collet assembly mounted at said outer end of said outer tubular member, said collet assembly being movable between an open position and a closed position, an inner tubular member disposed within said outer tubular member and defining an axial passageway, second drive means for rotating said inner tubular member, a tool holder mounted on said inner tubular member adjacent said collet assembly, means for axially translating said inner tubular member and said tool holder, pump means for supplying a fluid under pressure and means for coupling said pump means to said axial passageway of said inner tubular member.

22. The apparatus of claim 21 further including a middle tubular member disposed between said outer tubular member and said inner tubular member and coupled to said collet assembly and means coupled to said middle tubular member for moving said collet assembly between said open position and said closed position.

23. An apparatus for a spindle machine having at least one rotatable spindle comprising, in combination, an outer tubular member mounted for rotation and having an outer end, first drive means for rotating said outer tubular member, a collet assembly mounted at said outer end of said outer tubular member, said collet assembly including an axially movable middle tubular member disposed within said outer tubular member, a collet having an inner end coupled to said outer tubular member and an outer workpiece receiving end, said middle tubular member coupled to means for opening and closing said collet, an inner tubular member disposed within said middle tubular member and defining an axial passageway, pump means for supplying a fluid under pressure and means for coupling the said pump means to said axial passageway of said inner tubular member.

24. The apparatus of claim 23 further including second drive means for rotating said inner tubular member, a tool holder mounted on said inner tubular member adjacent said collet assembly and the means for axially for translating said inner tubular member and said tool holder.

* * * * *